UNITED STATES PATENT OFFICE.

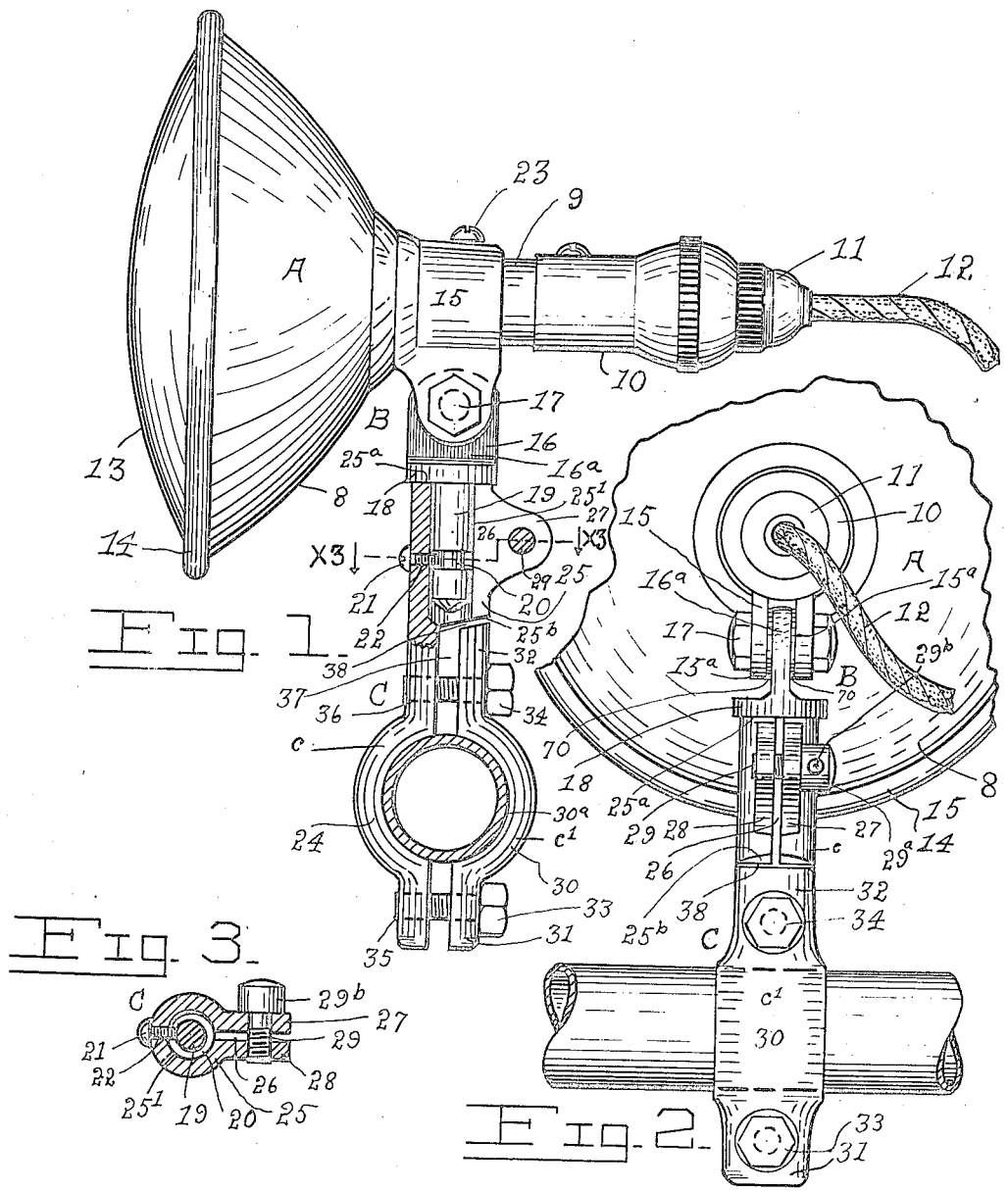

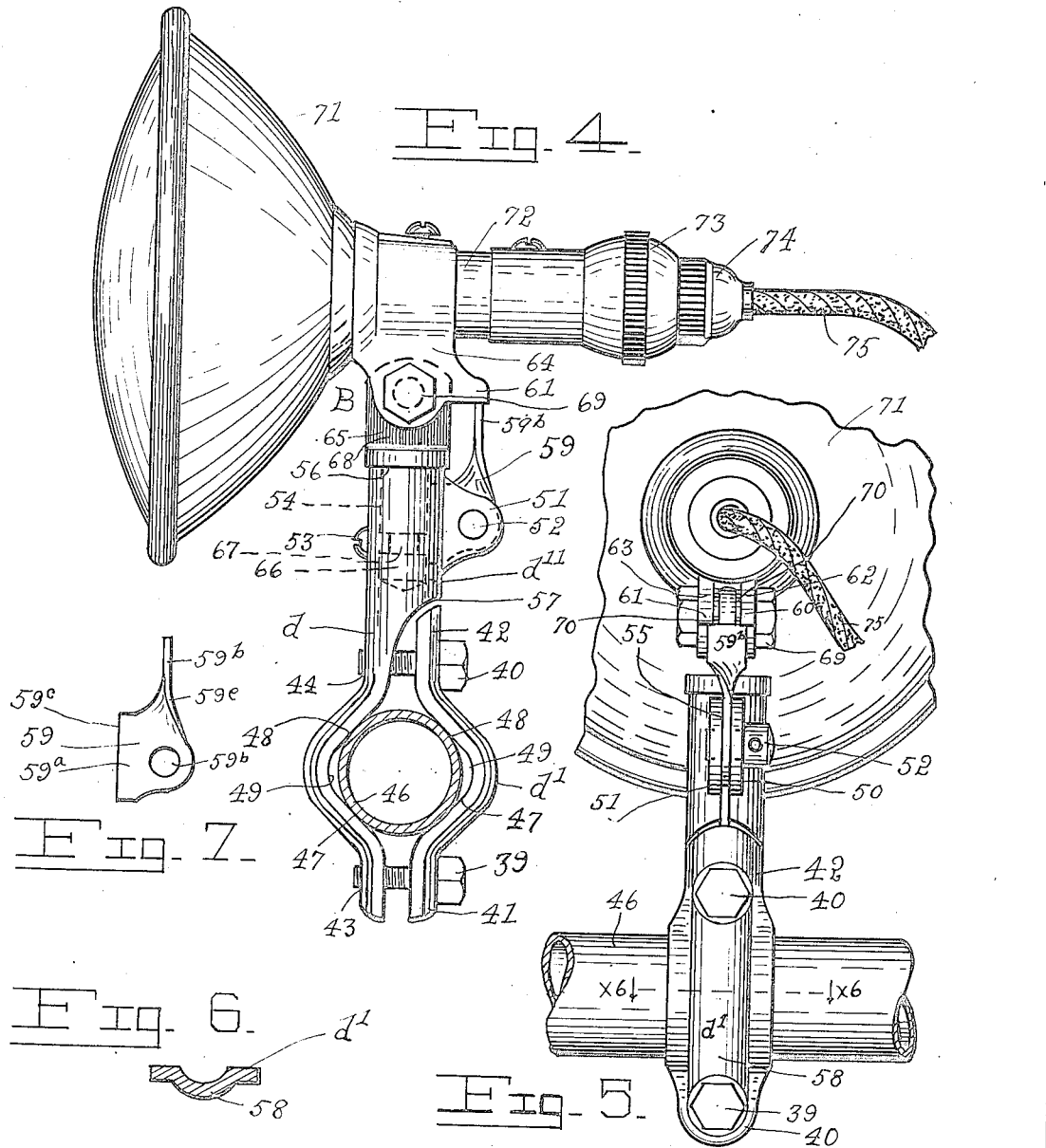

HAROLD G. FITZ GERALD, OF LOS ANGELES, CALIFORNIA.

VEHICLE LAMP.

1,425,190.

Specification of Letters Patent. Patented Aug. 8, 1922.

Application filed August 6, 1919. Serial No. 315,757.

*To all whom it may concern:*

Be it known that I, HAROLD G. FITZ GERALD, a citizen of the United States, residing at Los Angeles, in the county of Los Angeles and State of California, have invented new and useful Improvements in Vehicle Lamps, of which the following is a specification.

This invention relates to vehicle lamps, and it has for its object to provide an improved lamp which will be adapted for use on vehicles of various kinds, and which in the preferred form of the invention, will be particularly useful as a lamp for motorcycles, bicycles and the like, to which the same may be readily attached.

The object of my invention is to provide a lamp having a depending post and bracket so arranged that the lamp may be pivotally mounted for oscillation in a horizontal plane and vertical plane.

The invention has for further object the provision of an improved lamp of the general character stated which will be superior in point of relative simplicity of construction, inexpensiveness of organization, facility of attachment, convenience of use, compactness and sightliness of form, and positiveness in action and performance in service, and which will be generally superior in efficiency and serviceability.

With the above and other objects in view, the invention consists in the novel and useful provision, formation, construction, combination, association and relative arrangement of parts, members and features, all as hereinafter described, shown in the drawing and finally pointed out in claim.

In the drawing:

Figure 1 is side elevation of a lamp constructed and organized in accordance with the invention, parts being broken away and sectioned for clearness of illustration, the lamp being shown as applied to a motorcycle handle bar which is fragmentarily shown;

Figure 2 is a fragmentary rear elevation of the lamp shown in Figure 1;

Figure 3 is horizontal sectional view taken upon the line $x^3$—$x^3$, Figure 1;

Figure 4 is a view similar to Figure 1 but showing a modified form of lamp;

Figure 5 is a fragmentary rear elevation of the lamp shown in Figure 4;

Figure 6 is a horizontal detail sectional view taken on the line $x^6$—$x^6$, Figure 5, and looking in the direction of the appended arrows; and Figure 7 is a side elevation, in detailed position, of the stop member shown in Figures 4 and 5.

The parts in the several figures are designated by reference characters.

Referring with particularity to the drawing, in the embodiment of the invention shown in Figures 1 to 3, inclusive, A designates a lamp proper, B designates swivel means for the lamp A, and C designates a bracket for supporting the lamp from vehicle features.

The lamp proper A is shown as comprising a reflector 8 having a source of illumination, not shown, therein, a lamp socket 9 extending into the reflector 8, and a switch shown as provided with an exterior rotatable handle 10 whereby the electrical energy to be supplied the lamp may be cut off or turned on by the operator. A connection plug 11 is fitted into the rear end of the socket 9 and an insulated cable 12 extends from the plug 11 to a suitable supply of electrical energy. A front glass 13 is fitted to the front of the reflector, as by means of a clamping band 14.

The swivel means B is shown as comprising a swivel member 15 secured to the rear of the reflector 8, a swivel member 16 pivotally secured to the member 15, and a pivot bolt 17 passed through both members 15 and 16, the member 15 being bifurcated as at $15^a$ to receive a flat formation $16^a$ of the member 16, the members being suitably apertured to receive the bolt 17. A circular flange 18 is provided on the swivel member 16 and a swivel post 19 extends downwardly from such flange 18. The post 19 preferably has a circumferential groove or channel 20 adapted to receive the inner end of a radial pin or screw 21 passed through a suitable aperture 22 in the wall of the bracket to prevent the accidental or unauthorized separation of the parts. The swivel member 15 has a bore on the axis of the reflector to receive the lamp socket 9, and permit accurate focusing of the lamp in the reflector by adjusting the socket, a set screw 23 passing through a threaded aperture in the member wall and contacting with the socket acting to secure the socket in any position of adjustment.

The bracket C is shown as comprising a main member $c$, and a detachable clamping member $c^1$. The main member is formed with a clamping jaw 24 at its lower end, the jaw being formed at its inner face to conform to the vehicle member to which it is to be applied, as for instance the motorcycle handle bar shown fragmentarily in Figures 1 and 2; the member $c$ ranges upwardly from such jaw portion and overhangs the handle bar as at 25, and has a vertical bore $25^1$ extending throughout the bracket length from extreme top face $25^a$ to the lower face $25^b$ of the overhanging portion 25. The overhanging portion 25 is slotted radially from the bore $25^1$ outwardly throughout its length as at 26 and ears 27 and 28 are provided, one at each side of the slot 26. The ears 27 and 28 are apertured to receive a screw 29 which passes freely through the ear 27 but engages threads provided in the aperture in the ear 28. The screw 29 has a head $29^a$ which is shown as having a transverse aperture $29^b$ therein to receive an adjusting tool whereby the ears 27 and 28 may be drawn toward each other to constrict the walls of the member $c$ at the bore $25^1$ so to clamp the post 19, which is normally disposed in the bore $25^1$, to provide for the proper frictional engagement of post and bracket. The member $c$ has a threaded aperture through the wall at the bore $25^1$ and at the proper point in the bracket length to permit the screw 21 to enter the circumferential channel 20 when the flange 18 of the member 16 is seated upon the top face $25^a$ of the bracket member $c$.

The clamping member of jaw $c^1$ is preferably formed to match the lower portion of the member $c$ and has an intermediate portion 30 formed at its inner face to engage the handle bar as at $30^a$, and a lower extension 31 and an upper extension 32, which extensions are apertured to receive cap screws 33 and 34, respectively, which screws are passed therethrough and into threaded apertures at 35 and 36 provided in the main member $c$. Clearance is provided between the members $c$ and $c^1$ to permit of adjustment of the jaws thereof to the handle bar, as at 37 and 38. The bracket just described may be readily formed from castings of suitable metal.

In Figures 4, 5, 6 and 7 I have shown a form of the invention similar to the form shown in the other figures, but in which the bracket may be readily made of sheet metal stampings; furthermore, in Figures 4, 5, and 7, I have shown stop means whereby an operator may be prevented from directing the beam of light projected by the reflector upwardly in a straight ahead plane at an angle greater than that permitted by ordinances or laws in certain localities; however, such stop means may permit of manipulation of the lamp to project the beam from the reflector upwardly in other directions than the straight ahead direction.

In such form, the bracket is shown as comprising a main member $d$ and a clamping or jaw member $d^1$ secured thereto by means of cap screws 39 and 40 passed through apertures in extensions 41 and 42, respectively of the member $d^1$ and threaded into apertures at 43 and 44 in the main bracket portion $d$. The preferred formation of the inner faces of the lower portion of the main bracket $d$ and the detachable jaw portion $d^1$ where the handle bar 46 is received between such portions will be best understood by reference to Figure 4. Instead of the interrupted circular formation of the bracket shown in Figure 1, these jaws are each formed with two faces 47 and 48, at right angle to each other and merged into each other by a curved or circular surface 49. These divergent faces in right angled relation to each other permit of adjusting and affixing the bracket to round handle bars of various sizes. The main portion $d$ ranges upwardly and overhangs the handle bar as at $d^{11}$ and has the other features characteristic of the form shown in the other figures, apertured ears 50 and 51, adjusting screw 52, screw 53, bore 54, slot 55, and upper and lower faces 56 and 57 corresponding, respectively, to the ears 27 and 28, adjusting screw 29, screw 21, bore $25^1$, slot 26, upper face $25^a$ and lower face $25^b$ of the form of bracket hereinbefore described. However, in the construction of the bracket now being described, the sheet metal is bent into the required formation, instead of being cast and bored or otherwise formed. In Figure 6 the preferred cross-section through one of the jaws is shown, a rib 58 being struck or pressed outwardly from the sheet metal for purposes of strength as well as sightliness, as will be understood by persons skilled in the art.

The stop means is shown as comprising a sheet metal stamping 59 thin enough to be inserted in the slot 55, and a pair of rearwardly projecting fingers 60 and 61, one formed on each of the ears 62 and 63, of a bifurcated upper swivel member 64, otherwise constructed and applied as is the member 15 of the lamp hereinbefore described. A lower swivel member 65 similar to the member 16, and having a depending post 66 provided with a channel 67 has its upper flat portion 68 received between the ears 62 and 63 of the member 64, a swivel bolt 69 being passed through suitable apertures in the ears 62 and 63 and the flat portion 68. Friction washers 70 may be placed one on each side of the flat portion 68. Likewise such washers 70 may be placed one on each side of the flat formation $16^a$ of the member 16 of the lamp shown in Figures 1 and 2.

The stamping 59 comprised within the stop means has a body portion $59^a$ which lies in the main in the slot 55 being apertured as at $59^b$ to receive the adjusting screw 52 and has a forward straight edge $59^c$ which may lie against the depending post 66 of the lamp swivel member 65 when in position in the slot. An upwardly projecting finger 59$^d$ is formed with the body portion and lies transversely to the body portion due to its twisted formation at 59$^e$, so as to check downward movement of the fingers 60 and 61 of the swivel member 64.

The lamp shown as mounted in the bore of the bracket member $d$ is similar to the one described in connection with the other figures and has a reflector 71 supported by the swivel member 64, a lamp socket 72, a switch 73, connection plug 74, and cable 75.

It will be understood that the stop means shown may be used in connection with the lamp shown in Figures 1, 2 and 3, if desired.

To remove the lamp proper from its bracket, in either form of the invention, as when the lamp is to be used as a trouble or inspection lamp about the vehicle, the operator loosens the adjusting screw, and removes the set screw, whereupon the lamp with its swivel may be removed from the bracket.

The overhanging portion of the bracket, through which the bore extends, is slitted as clearly shown in the drawing. The slitting permits the construction of such wall when pressure is applied to the ears by the adjusting screw, so permitting a nicety of adjustment for the swivel, the wall contacting with the depending post evenly throughout the greater portion of its surface.

Having thus disclosed my invention, I claim and desire to secure by Letters Patent:

A vehicle lamp comprising a lamp proper having a depending post, and a bracket adapted to support said lamp proper; said bracket having clamping jaws at its one end and having a slotted undercut cylindrical extension in which said post is received, and means for constricting the walls of said extension to frictionally engage said post; there being means for preventing accidental separation of said post and said bracket, and means to check movement of the lamp proper in one direction in a vertical plane; said last named means comprising a member supported in the slot of said extension.

In testimony whereof, I have signed my name to this specification in the presence of two subscribing witnesses.

HAROLD G. FITZ GERALD.

Witnesses:
ALFRED H. DAEHLER,
J. W. BURNS.